United States Patent [19]

Golden et al.

[11] 4,187,723
[45] Feb. 12, 1980

[54] LIQUID NITROGEN LEVEL INDICATOR

[75] Inventors: Stephen P. Golden, Huntsville; Charles T. Jennings, New Market, both of Ala.

[73] Assignee: The United States of America as represented by the Secretary of the Army, Washington, D.C.

[21] Appl. No.: 951,925

[22] Filed: Oct. 16, 1978

[51] Int. Cl.$^2$ ............................................. G01F 23/22
[52] U.S. Cl. .................................................... 73/295
[58] Field of Search ................... 73/295, 344, 359 R, 73/360

[56] References Cited

U.S. PATENT DOCUMENTS

| | | | |
|---|---|---|---|
| 3,151,468 | 10/1964 | Martin | 73/295 X |
| 3,181,557 | 5/1965 | Lannan, Jr. | 73/295 X |
| 3,267,730 | 8/1966 | Satterthwaite et al. | 73/295 |
| 3,371,533 | 3/1968 | Dumas | 73/295 |
| 3,435,680 | 4/1969 | Holzer | 73/295 |
| 3,496,773 | 2/1970 | Cornish | 73/295 |
| 3,500,687 | 3/1970 | Smith | 73/295 |
| 3,512,412 | 5/1970 | Weining | 73/295 |
| 3,740,740 | 6/1973 | Milo | 73/295 X |
| 3,914,950 | 10/1975 | Fletcher et al. | 73/295 X |
| 3,938,347 | 2/1976 | Riedel et al. | 73/295 X |

Primary Examiner—John Petrakes
Attorney, Agent, or Firm—Nathan Edelberg; Robert P. Gibson; Robert C. Sims

[57] ABSTRACT

Sensing elements are located at various required levels in a vacuum dewar. Resistance changes are detected external to the container and used to indicate the presence of a liquid at a particular level.

1 Claim, 2 Drawing Figures

LIQUID NITROGEN LEVEL INDICATOR

DEDICATORY CLAUSE

The invention described herein may be manufactured, used, and licensed by or for the Government for governmental purposes without the payment to me of any royalties thereon.

BACKGROUND OF THE INVENTION

This invention is utilized at present as part of an infrared aircraft detection system. This system has 28 IR detectors arranged in a vertical line and located in a glass dewar. These detectors have to be cooled to 77° K. by liquid nitrogen $LN_2$ for proper operation. The detector-dewar assembly is located in the focal plane of a Schmidt optical system. This optical unit is rotated at a 1 revolution/second rate and becomes the scanning head of the infrared aircraft detection system. During cooling of the IR detectors and normal operation of the infrared aircraft detection system, the detector-dewar assembly is not visible to the operator. Damage to the glass dewar can occur if the $LN_2$ chamber is overfilled and improper operation of the system will occur if the $LN_2$ level becomes too low and the IR detectors start to warm. The Liquid Nitrogen Indicator was designed to indicate the level of $LN_2$ in the dewar and prevent damage or improper operation of the infrared aircraft detection system.

DESCRIPTION OF PREFERRED EMBODIMENT

The invention is used to serve a dual purpose in this application. The device indicates an insufficient level of $LN_2$ in the dewar. The device also will indicate a filled or an overfilled dewar to prevent over flow of the dewar and possible damage to the infrared detection system. The advantage of the system is that the indicators can be remote to the dewar system. This feature is necessary in that the $LN_2$ dewar is not visible to the operator for filling purposes.

Figure 1:
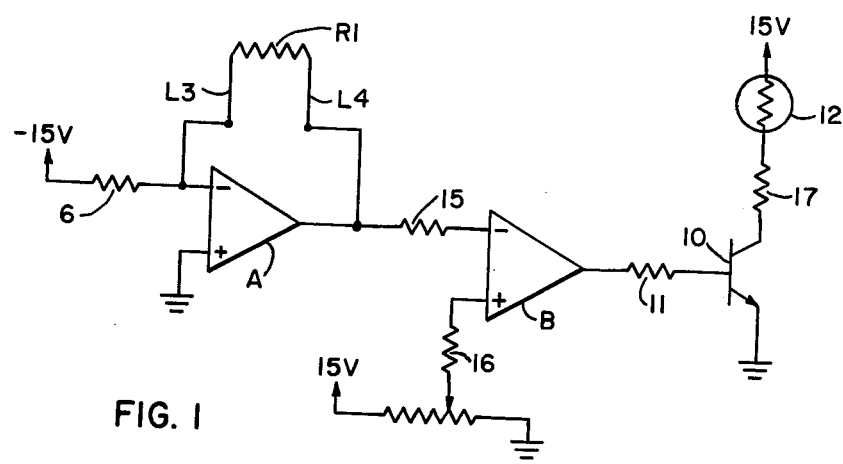
FIG. 1 is a schematic circuit showing the preferred embodiment of the invention.

The indicator consists of two identical sensing circuits. Only one circuit is shown in FIG. 1. One circuit is for the higher levels of nitrogen, and the other one is for the lower level of nitrogen. The 1 K, 1/10 W resistors R1 and R2 (see FIG. 2) are physically placed in the liquid nitrogen container 5 such that R2 will be located near the top of the container and labeled upper level sensor, and R1 is located near the bottom of the container and labeled lower level sensor. The indicator works on the principal that the resistance of the sensors will increase when immersed in liquid nitrogen due to a large temperature differential. Varistors could be used for R1 and R2. Since the resistor has a constant current flow through it established by operational amplifier A and the 3 K resistor 6 tied to the −15 V. supply, the change in resistance of the sensor R1 will result in a change in output volts at the output of operational amplifier A. This voltage change can be detected by amplifier B which is a voltage comparator. Potentiometer 7 on the comparator is adjusted such that the output of amplifier B is high when the 1 K ohm, 1/10 watt sensor resistor R1 is uncooled. When the resistor is cooled, the increased resistance of the sensor and corresponding increased voltage at the output of operational amplifier A will result in the comparator B switching such that its output goes low. The output of the comparator amplifier B drives into the base of a NPN silicon low power transistor 10 through a 2 K ohm resistor 11. When comparator B is high, or +3 V, the transistor turns on, and the 50 MA bulb 12 will glow. When comparator B goes low, or −0.5 V, transistor 10 is biased off, and bulb 12 will not glow. Therefore, when sensor R1 is uncooled, an indication of no nitrogen, the lamp will glow. When the sensor is cooled, an indication of the presence of liquid nitrogen, the lamp will be off.

Two 4.7 K ohm resistors 15 and 16 can be used for connections to the inputs of amplifier B. A 200 ohm resistor 17 can be used in the bulb circuit.

Two level sensors are utilized, one at the top of the container and one at the bottom. The upper level sensor indicates a filled or an overfilled container, while the lower level sensor will indicate when the container is near empty. If desired, a PNP transistor could be used with the circuit containing the R2 sensor so as to reverse the operation of the indicator bulb. This would make the bulb light up when R2 was immersed.

Figure 2:
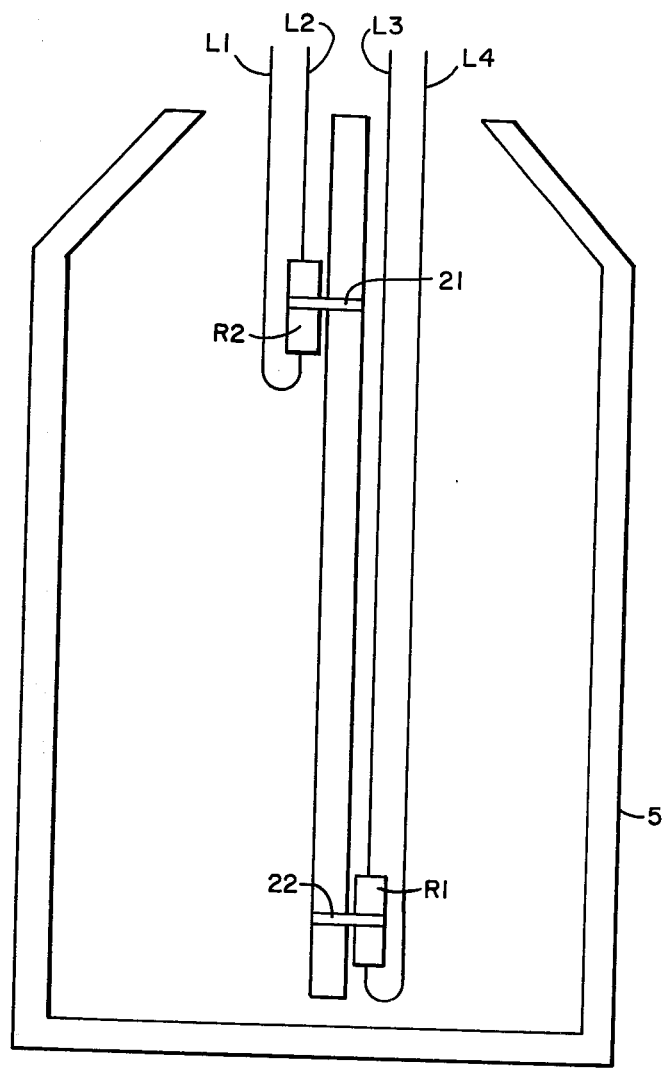
FIG. 2 is a diagrammatic showing of the location of the sensors in the dewar.

The sensing resistors R1 and R2 are mounted to a rod 20 made of wood or other material with low thermal conductivity (see FIG. 2). The resistors are attached to rod 20 by means of heat shrinkable tubing 21 and 22. Leads from the resistors are attached to the rod in a similar manner using shrinkable tubing, not shown. The mounting rod may be attached in position in the dewar 5 by means of external or internal mounting brackets as required (not shown). The leads L1, L2, L3, and L4 are brought out external to the dewar to the electronics and lamp indicators for remote sensing of the $LN_2$ levels in the dewar. Only two wires are required to exit the system for each level sensor.

More than two sensors can be used. Special pressure tight connectors can be used to exit the sensor leads if the system is pressurized above atmospheric pressure. The specific values of the components are given as an example only.

We claim:

1. A system for indicating the presence or absence of a fluid in a given area comprising a first variable resistance means located at said area; said resistance means changing its resistance in accordance to the presence or absence of said fluid; first circuit means connected to said variable resistance means so as to determine its resistance, and therefore, whether the fluid is present or absent; said first circuit means comprising a first constant current generator connected to said first variable resistance means so as to cause a constant current to flow through said variable resistance means; a first comparator means connected to sense the voltage across said variable resistance means; first indicator means connected to the output of said comparator means so as to indicate the presence or absence of said fluid; a second variable resistance means located in a second area; a second circuit means identical to said first circuit means connected to said second variable resistance means so as to indicate the presence or absence of fluid at said second area; said first and second areas being located in a container that holds said fluid; said first area being located at an upper end of said container; said second area being located at a lower end of said container; a wood rod; two heat shrinkable tubings attaching said first and second variable resistance means to said wood rod; and said wood rod being located inside said container so as to position said resistance means in their respective areas in the container.

* * * * *